United States Patent [19]

Mitsui

[11] 4,145,012
[45] Mar. 20, 1979

[54] FILM CASSETTE
[75] Inventor: Kazuhiko Mitsui, Hachioji, Japan
[73] Assignee: Olympus Optical Co., Ltd., Tokyo, Japan
[21] Appl. No.: 865,255
[22] Filed: Dec. 28, 1977
[30] Foreign Application Priority Data
   Jan. 14, 1977 [JP] Japan ............................... 52/3477[U]
[51] Int. Cl.² ............................................. B65H 75/28
[52] U.S. Cl. ..................................... 242/74; 242/71.2
[58] Field of Search ................................. 242/71.2, 74
[56] References Cited
   U.S. PATENT DOCUMENTS
   1,757,241  5/1930  Forse ..................................... 242/74

3,701,495  10/1972  Holliday ............................. 242/71.2

FOREIGN PATENT DOCUMENTS
1391723  1/1965  France.

Primary Examiner—Edward J. McCarthy

[57] ABSTRACT

A film cassette has a hollow cylindrical film takeup shaft rotatably mounted on a side wall of the film cassette and provided with a slit. The slit extends from the free end of the film takeup shaft in the axial direction thereof. A stop larger than the slit is provided on an end of a film which is inserted in the slit. The end of the film is easily and unfailingly connected to the shaft, and the stop prevents the film end from slipping out of the slit.

4 Claims, 11 Drawing Figures

FILM CASSETTE

BACKGROUND OF THE INVENTION

This invention relates to a film cassette for cameras and the like, in particular to a film cassette with an improved film takeup shaft.

One end of a film used in a camera has to be connected to the film takeup shaft of a film cassette in the darkroom. Thus it is desired that the film be connected to the shaft without fail and by a simple manual operation. Some methods of connecting a film to a film takeup shaft are known. In one method, as shown in FIG. 1, an adhesive tape 1 is used to attach an end of a film 2 to the periphery of a film takeup shaft 3. In another method, as shown in FIG. 2A, a portion of a film takeup shaft 4 is cut away into a flat part 5 and a T-shaped engaging member 6 is planted on the flat part 5. In this method, one end of a film 7 is provided with an elongated hole 8, and the film 7 is oriented parallel with the axis of the shaft 4 so that the engaging member 6 fits into the hole 8. Once the engaging member 6 has been fitted into the hole 8, the film 7 is oriented at 90° to the axis of the shaft 4 thereby to connect the end of the film 7 to the film takeup shaft 4, as shown in FIG. 2B. Either method is so difficult that a manual operation sometimes fails to achieve the rigid connection of a film to the film takeup shaft.

SUMMARY OF THE INVENTION

The object of this invention is to provide a film cassette in which the film takeup shaft is so improved as to hold one end of a film easily and unfailingly.

A film cassette according to this invention has a hollow cylindrical film takeup shaft rotatably mounted on a side wall of the film cassette and provided with a slit. The slit extends from the free end of the film takeup shaft in the axial direction of the shaft. A stop larger than the slit is provided on an end of a film which is inserted in the slit. The slit and the stop cooperate to connect the end of the film to the shaft very easily and unfailingly.

Where the slit is so formed as to open at the free end of the film takeup shaft, the end of the film will be more easily connected to the shaft.

DETAILED DESCRIPTION OF THE PREFERRED EMBODIMENTS

A film cassette according to this invention will be described in detail, in case it is loaded in the distal end portion of an endoscope for taking pictures of human body cavities.

Figure 1:
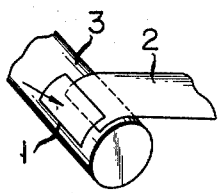
FIGS. 1, 2A and 2B show how to connect one end of a film to the film takeup shaft of conventional film cassettes.
Figure 2A:
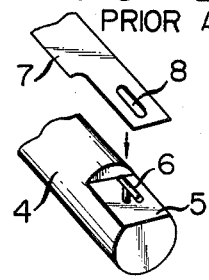
Figure 2B:
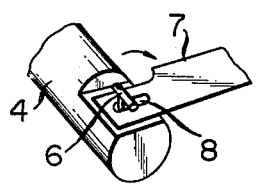
Figure 3:
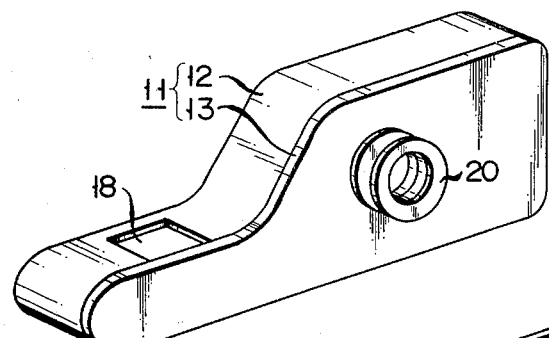
FIG. 3 is a perspective view of a film cassette according to this invention.
Figure 5:
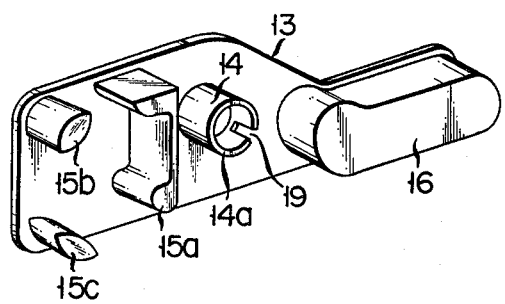
FIG. 5 is a perspective view of the inner structure of the film cassette of FIG. 3.
Figure 4:
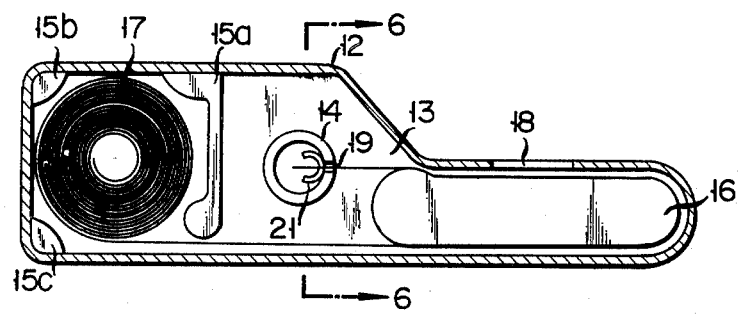
FIG. 4 is a longitudinal cross-sectional view of the film cassette shown in FIG. 3.

As shown in FIG. 3, a case 11 of a film cassette according to this invention comprises a housing or cover 12 and a side wall or base plate 13 covering the housing 12. In the housing 12, a film takeup shaft 14 is rotatably mounted on the side wall 13 as shown in FIG. 4. As shown in FIGS. 4 and 5, film holding members 15a, 15b and 15c are provided on a forward portion of the side wall 13 so as to protrude from the inner surface of the side wall 13, and a guide member 16 is provided on the rear portion of the side wall 13. The film holding members 15a, 15b and 15c hold a rolled film 17, the outer end of which is connected to the film takeup shaft 14 in such a manner as will be described later. The uncoiled portion of the film 17 is guided by the guide member 16.

The housing 12 has an exposure window 18 which is located above the guide member 16. Through this window 18 and an optical system (not shown) disposed in the distal end portion of the endoscope, one frame of the film 17 can be exposed.

Figure 6:
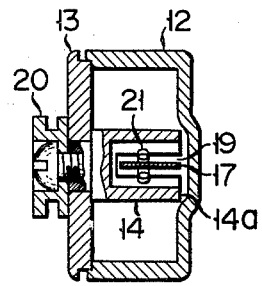
FIG. 6 is a cross sectional view of the film cassette, taken along line 6—6 in FIG. 3.

As shown in FIG. 6, the film takeup shaft 14 is hollow cylindrical and penetrates through the side wall 13 at its one end. A long slit 19 is formed in the lateral wall of the shaft 14 so as to extend axially from the other free end 14a. A pulley 20 is fixed by means of a screw to said one end of the shaft 14 which extends out of the side wall 13. A wire (not shown) is wound around the pulley 20. Every time it is pulled toward an operation unit (not shown) of the endoscope for a predetermined distance, the wire rotates the pulley 20 and thus the shaft 14 is rotated through an angle which corresponds to one-frame length of the film 17.

The outer end of the rolled film 17, which is inserted in the film takeup shaft 14 through the slit 19, has a small hole. Inserted into the small hole is a C-shaped ring 21 made of a round metallic or plastics bar. The C-shaped ring or stop 21 has such a large size that it prevents the outer end of the film 17 from slipping out of the shaft 14 through the slit 19.

To connect the outer end of the film 17 to the film takeup shaft 14, the C-shaped ring 21 is inserted into the small hole, and then the ring 21 together with the film end is put into the shaft 14 from the free end 14a thereof, thereby easily connecting the film end to the film takeup shaft 14. This simple and easy connection between the shaft 14 and the outer end of the film 17 can be made with hands unfailingly in the darkroom.

Figure 7:
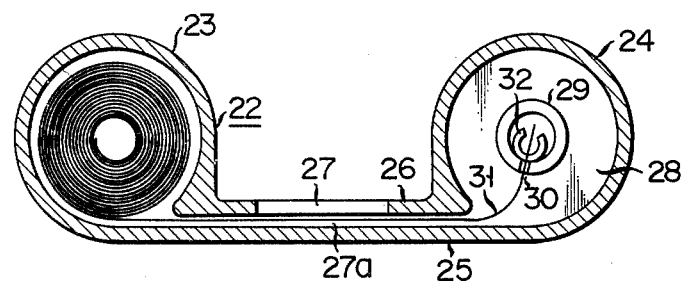
FIG. 7 is a longitudinal cross sectional view of another embodiment of this invention.

Another film cassette according to this invention is shown in FIG. 7. A housing or cover 22 of this film cassette comprises a cylindrical film feed section 23, a cylindrical film takeup section 24 and a pair of shield plates 25 and 26 which bridge the sections 23 and 24. The plate 25 extends tangentially to the peripheries of both sections 23 and 24. The other plate 26 extends parallel to the plate 25 and closer to the centers of the sections 23 and 24 than the plate 25. At its middle portion the plate 26 has an exposure window 27. The housing 22 has an opening, which is covered up with a side wall or base plate 28.

On the inner surface of the side wall 28, a film takeup shaft 29 is rotatably mounted with its axis aligned with the center of the film takeup section 24. As in the film cassette shown in FIGS. 3 to 6, the film takeup shaft 29 is hollow cylindrical and a long slit 30 extends axially from the free end of the shaft 29 in its lateral wall. A rolled film 31 is disposed in the film feed section 23, and its outer end is connected to the film takeup shaft 29. The unrolled outer portion of the film 31 is positioned in a passage 27a which is defined between the plates 25 and 26. The outer end of the film 31 is connected to the shaft 29 in the same manner as in the cassette illustrated in FIGS. 3 to 6. A C-shaped ring or stop 32 is identical with the ring 21 and is inserted in a small hole of the outer end of the film 31.

The film cassette shown in FIG. 7 is loaded also in the distal end of an endoscope for taking pictures of human body cavities. The film 31 is exposed through the exposure window 27 and an optical system (not shown) disposed in the distal end of the endoscope.

To connect the end of the film 31 to the film takeup shaft 29, the C-shaped ring 32 is inserted into the small hole of the outer end of the film 31. Then, the ring 32 now attached to the outer end of the film 31 is put into the shaft 29 from the free end thereof through the slit 30, thus easily connecting the film end to the film takeup shaft 29. This simple connection between the film 31 and the shaft 29 can be made with hands unfailingly in the darkroom.

Figure 8:
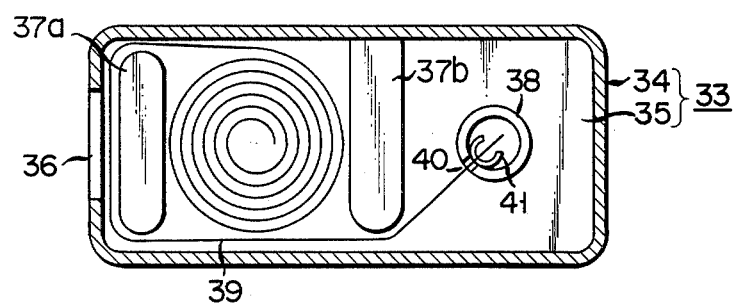
FIG. 8 is a longitudinal cross-sectional view of a further embodiment of this invention.

Still another film cassette according to this invention is shown in FIG. 8. The case 33 of this cassette is rectangular and comprises a rectangular housing or cover 34 and a side wall or base plate 35 covering the housing 34. Formed in the front surface of the cover 34 is an exposure window 36. On the inner surface of the base plate 35 there are provided film holding members 37a and 37b. Further, on the inner surface of the base plate 35, a film takeup shaft 38 is rotatably mounted. A rolled film 39 is held between the film holding members 37a and 37b. Unrolled outer portion of the film 39 is guided between the exposure window 36 and the film holding member 37a and is connected to the film takeup shaft 38 in the same manner as in the cassettes illustrated in FIGS. 3 to 6 and FIG. 7. In other words, the outer end of the film 39 is inserted into the shaft 38 through a slit 40 formed in the free end portion of the shaft 38. A C-shaped ring or stop 41 is attached to the outer end of the film 39, thus preventing the film 39 from slipping out of the shaft 38 through the slit 40. As in the cassettes shown in FIGS. 3 to 6 and FIG. 7, the outer end of the film 39 can be easily connected by hand to the film takeup shaft 38 in the darkroom.

Figure 9:
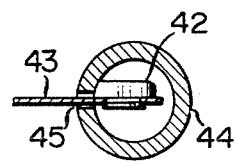
FIG. 9 shows another embodiment of a stop.

In the above-mentioned embodiments of this invention, the C-shaped ring made of a round bar is used to prevent the outer end of a film from slipping out of the film takeup shaft. Instead, use may be made of any member that is attached to the outer end of a film and can prevent the film end from slipping out of the film takeup shaft. For example, such a rivet-like member or stop 42 as shown in FIG. 9 may be inserted into a small hole made in the outer end portion of a rolled film 43 and then secured steadfastly to the film end. The rivet-like member 42 attached to the film end is put into a film takeup shaft 44 from the free end thereof. Once placed in the shaft 44, the member 42 prevents the end of the film 43 from slipping out of the shaft 44 through a slit 45 extending axially from the free end of the shaft 46 in its periphery.

Figure 10:
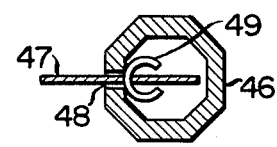
FIG. 10 is a cross-sectional view of another embodiment of a film takeup shaft.

In the aforementioned embodiments of this invention, a hollow cylindrical shaft is used to take up a film. The film takeup shaft need not be limited to this type. For example, such a hollow octagonal shaft 46 as shown in FIG. 10 may be used. The free end portion of the octagonal shaft 46 has a slit 48. A C-shaped ring or stop 49 is attached to the outer end of a rolled film 47 and then put into the octagonal shaft 46. Once placed in the shaft 46, the ring 49 prevents the end of the film 47 from slipping out of the shaft 46 through the slit 48. Thus, the end of the film 47 can be connected to the octagonal shaft 46 as easily as in any one of the aforementioned embodiments.

Further, the present invention need not be limited to film cassettes for endoscopes. It can be applied to any kind of cassettes that is generally called film cassettes.

What is claimed is:

1. A film cassette comprising a housing, a side wall, a generally hollow cylindrical film takeup shaft rotatably mounted on the side wall at one end thereof and formed in the peripheral wall thereof with an axially extending slit through which an end of a film is inserted, and a stop substantially perpendicularly, penetrating a central portion of the end of the film and extending transversely of, and beyond the slit.

2. A film cassette according to claim 1, wherein said stop comprises a rod-like member.

3. A film cassette according to claim 2, wherein said rod-like member comprises a C-shaped ring.

4. A film cassette according to claim 1, wherein said stop comprises a rivet-like member secured to the end of the film.

* * * * *